Figure 1:
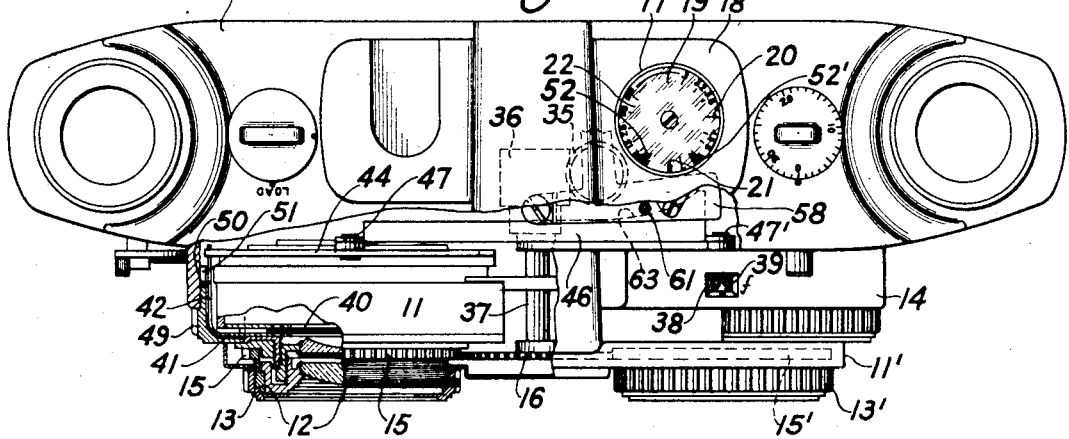

May 30, 1944.     D. L. BABCOCK ET AL     2,350,009

DEPTH OF FIELD INDICATOR FOR CAMERAS

Filed Oct. 28, 1941     2 Sheets-Sheet 1

David L. Babcock
Floyd J. Frisby
INVENTORS

BY
ATTORNEYS

May 30, 1944.   D. L. BABCOCK ET AL   2,350,009
DEPTH OF FIELD INDICATOR FOR CAMERAS
Filed Oct. 28, 1941   2 Sheets-Sheet 2

David L. Babcock
Floyd J. Frisby
INVENTORS

BY
ATTORNEYS

Patented May 30, 1944

2,350,009

UNITED STATES PATENT OFFICE 2,350,009

DEPTH OF FIELD INDICATOR FOR CAMERAS

David L. Babcock and Floyd J. Frisby, Rochester, N. Y., assignors to Eastman Kodak Company, Rochester, N. Y., a corporation of New Jersey Application October 28, 1941, Serial No. 416,824

6 Claims. (Cl. 95—45)

The present invention relates to a focusing mechanism for cameras, and particularly to a depth of field indicator which will show directly on the focusing scale the depth of field of the lens for different adjustments of focus and different diaphragm settings.

It is well known to those skilled in the art that the depth of field of any given focal length lens varies not only with the size of the diaphragm opening but also with the focus adjustment of the lens. By depth of field of a lens is meant the range of definition of the lens, or the distance of the nearest and farthest objects from the focal plane of the lens which will be in sharp focus.

Information as to the depth of field of a lens is oft times invaluable to a photographer. For instance, if a photographer wishes to include certain objects spaced apart axially of the optical axis of the lens in a picture to be sure they are in focus, without benefit of ground glass focusing, he must know what diaphragm opening at a given focus will give him the desired depth of field. Furthermore, if the lighting conditions are such that there is no choice as to what diaphragm opening can be used to obtain proper exposure, then the photographer must know what focus he must use to obtain the desired depth of field.

Many depth-of-field calculating arrangements have heretofore been provided for indicating what depth of field exists for different ranges of focus and diaphragm settings, and for aiding a photographer in choosing the proper ranges of focus and diaphragm openings to obtain desired depths of field. Certain of these depth-of-field indicators comprise two relatively movable scales based on ranges and diaphragm settings for a given focal length lens, but are in reality merely calculators. Those known depth-of-field indicators which are associated with the focusing mechanism of the lens have either the focusing scale or the depth-of-field scale connected to the focusing mechanism, or the diaphragm setting mechanism, respectively, to be moved over the other scale which is stationary instead of having each scale movable relative to the other in response to adjustment of the mechanism it is related to. These indicators are, in reality, no more than calculators because two spaced indices on the depth-of-field scale must be checked across two corresponding range indices on the focusing scale.

Therefore, one object of the present invention is the provision of a depth-of-field indicator which gives a direct reading of the depth of field for any focus adjustment and diaphragm setting of a lens without requiring calculation of any sort or the comparison of the indices on two relatively movable scales.

Another object is to provide a depth-of-field indicator in which the diaphragm setting and focus adjustment for any given depth-of-field is indicated directly without calculation of any kind or without requiring reference to two or more scales.

A further object is the provision of a depth-of-field indicator in which a pair of depth-of-field indicating members are connected to, and moved by, the diaphragm operating mechanism over a focusing scale which is in turn moved relative to the depth-of-field indicating members by adjustment of the focusing mechanism, whereby the indicated depth of field is properly altered by either a change in the diaphragm setting, by a change in the focus adjustment of the lens, or by a combination of both.

And another object is the provision of a depth-of-field indicator which comprises a focusing scale movable relative to a stationery index by operation of the focusing mechanism, and a pair of pointers movable relative to and over said focusing scale symmetrically on opposite sides of said index by operation of the diaphragm adjusting mechanism, whereby the two pointers will indicate directly on the focusing scale the depth of field for any given adjustment of focus and diaphragm setting.

And yet another object of the present invention is the provision of a depth-of-field indicator of the type set forth which is mounted on the camera body in a conspicuous place remote from the camera lens proper.

Another object is the provision of a depth-of-field indicator of the type set forth which is particularly adapted for use with a stereo type of photographic camera.

And a still further object is to provide a depth-of-field indicator which is simple and efficient in construction and operation, gives direct readings of focus and depth of field, and has the mechanism all built into the camera so that it is tamper-proof and protected against injury due to the entrance of foreign matter.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawings in which, Fig. 1 is a top plan view, partly in section, of the stereo photographic camera equipped with a depth-of-field indicator constructed in accordance with the preferred embodiment of the present invention.

Figure 2:
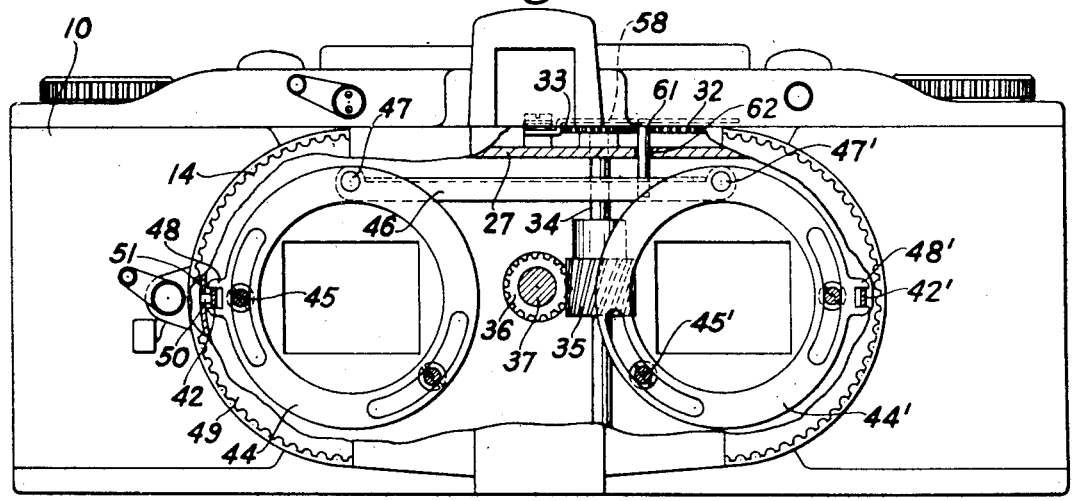
Figure 6:
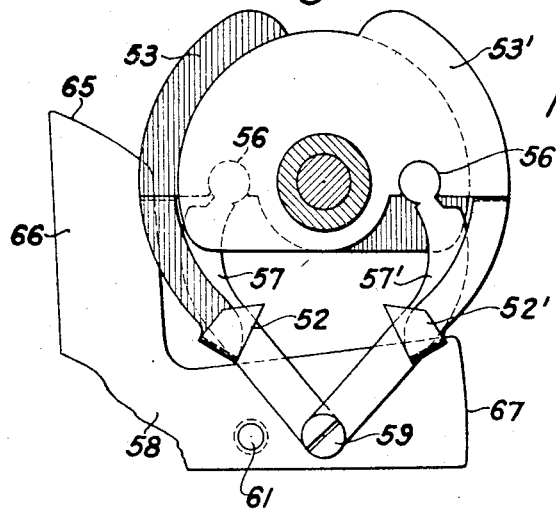
Figure 7:
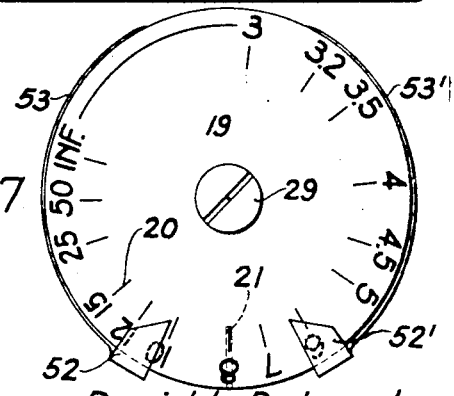
Figure 3:
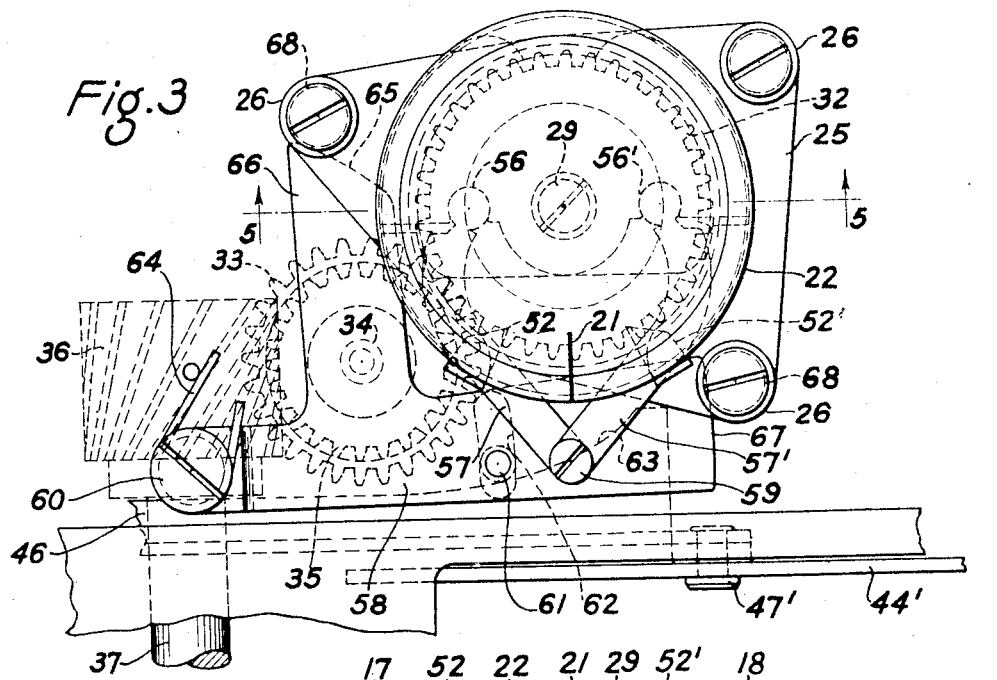
Figure 4:
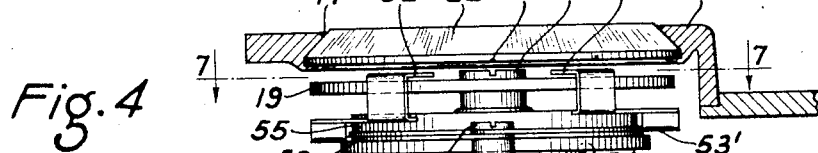
Figure 5:
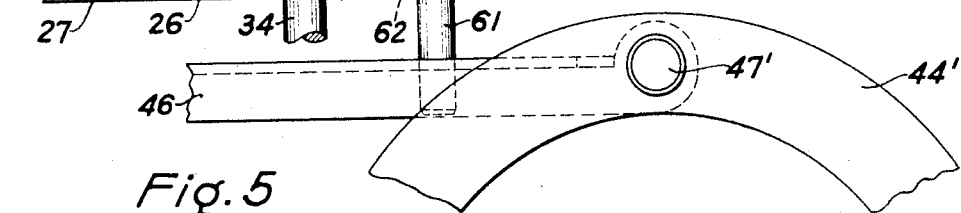

Fig. 2 is a front view of the camera with the lens mounts removed to show the connection between the diaphragm operating and focusing mechanism and the depth-of-field indicator proper, Fig. 3 is an enlarged plan view of the depth-of-field indicator and the adjusting mechanism therefor, the camera body parts and focusing scale markings being omitted for purposes of clarity, Fig. 4 is a front elevational view of the depth-of-field indicator and adjusting mechanism therefor on the scale shown in Fig. 3, and showing the manner of mounting the window in the camera wall over the depth-of-field indicator and the manner of mounting the mechanism on the mechanism plate in the camera body, Fig. 5 is a section taken substantially on line 5—5 of Fig. 3, Fig. 6 is an enlarged detailed view showing the motion transmission mechanism between the depth-of-field pointers and the diaphragm adjusting mechanism, Fig. 7 is an elevational view taken substantially on line 7—7 of Fig. 4, and showing how the depth-of-field pointers cooperate with the focusing scale to clearly indicate the depth of field of the lens.

Like reference characters refer to corresponding parts throughout the drawings.

In general, the present invention relates to a depth-of-field indicator which is operatively associated with the focusing and diaphragm adjusting mechanisms of a camera objective in such a way that it is adjusted by a focusing movement of the objective and/or by an adjustment of the objective diaphragm to give a direct reading of the depth of field of the objective in accordance with either one, or both, of these adjustments. In its broadest aspects this depth-of-field indicator comprises a movable member bearing a focusing scale which is adapted to be moved relative to a fixed index by adjustment of the focusing mechanism of the objective. A pair of oscillatably mounted pointers are mounted to cooperate with said focusing scale, one on either side of said index, and are connected to the diaphragm operating mechanism by a mechanism which causes said pointers to move over said focusing scale simultaneously and symmetrically with respect to said index relative to said focusing scale by, and in accordance with, an adjustment of said diaphragm operating means.

Referring now to the drawings, Fig. 1 shows a photographic camera 10 of the stereo type having two shutters 11 and 11' located in the front of the camera in spaced relation as is well known in the art. The shutter may be of a well-known type as indicated and comprise a casing within which a camera objective composed of a plurality of lens elements may be mounted to permit focusing the objective. As is well known, the objective may be focused by rotation of a focusing ring 12 extending from the front of the shutter casing and on the outer end of which is attached in any suitable manner, as by a threaded connection as shown, a knurled manipulating ring 13 which is accessible from the outside of the housing 14, enclosing the shutters, for manual manipulation. Fixed to the focusing ring 12 of each objective is a gear 15, 15', said gears being connected by a pinion 16 so that the focusing of one objective will be transmitted to the other objective to cause a corresponding focus adjustment of both objectives by the manipulation of the one ring 13. Inasmuch as each of the two shutters are identical in structure and operation the corresponding parts of the two will be indicated by the same reference characters, but with those pertaining to one shutter being primed (').

Rotatably mounted in the camera body 10, to be visible through an aperture 17 in the top wall 18 thereof, is a focus indicator member in the form of a disk 19 provided on its top face with a focusing scale 20 marked off in feet. This focusing scale cooperates with a stationary index 21 to indicate the focus adjustment of the objective. The stationary index 21 may be associated with any part of the camera body, but for the sake of illustration we have shown it as being etched on the under side of a window 22 which is fastened in the top wall of the camera body in the aperture 17 in any suitable manner.

The focus indicator 19 is connected to the focusing mechanism of the objectives so that it will be rotated relative to the stationary index by a focusing of the objectives and indicate at any time the focus adjustment of said objectives. To this end, a bearing plate 25 is mounted atop three spacing posts 26 in parallel spaced relation on a mechanism plate 27 extending across the top of the camera body and in turn supports a bearing 28 fixed thereto in any suitable manner. The focus indicator 19 is attached, by a screw 29, to one end of a stub-shaft 30 extending through, and rotatably mounted in, the bore 31 through the bearing 28. Fixed to the opposite end of the stub-shaft is a spur gear 32 which meshes with another spur gear 33 fixed to the end of a shaft 34 extending transversely of the camera body and rotatably mounted therein. A spiral gear 35 fixed to the intermediate portion of the shaft 34 meshes with a spiral gear 36 mounted on a shaft 37 extending parallel to the optical axes of the camera and having the pinion 16 fixed to one end thereof, which pinion connects the two focusing gears 15 and 15'. It will, therefore, be clearly understood that as the manipulating ring 13 is rotated to focus one objective, the other objective will be correspondingly adjusted by virtue of the connection between the gears 15, 15' and pinion 16; and that rotation of the shaft 37 by the pinion 16 will, through the gearing set forth, including spiral gears 35, 36 and spur gears 32 and 33, cause the focus indicator to be rotated relative to the index for the purpose of indicating the focus adjustment of the objectives at any instant.

In accordance with the present invention, the depth of field of the objective is adapted to be directly indicated on the focusing scale by two depth-of-field indicating members, or pointers, which cooperate with the focusing scale and move relative thereto symmetrically on opposite sides of the stationary index. Inasmuch as the depth of field of a lens varies in accordance with the adjustment of the diaphragm these indicating members must be moved relative to the focusing scale by, and in accordance with an adjustment of the diaphragm. One indicating member will always indicate the nearest distance an object may be relative to the camera and be in focus, and the other pointer will indicate the farthest distance an object can be from the camera and be in focus. The span of distances between the two pointers will be the depth of field of the lens for any given focus and diaphragm setting.

Referring now to the drawings, the mounting of the depth-of-field indicating members and the mechanism for adjusting them by, and in accordance with, an adjustment of the diaphragm operating mechanism will now be set forth. As shown in Fig. 1, each shutter casing may include an adjustable diaphragm 40, of well-known construction, including a rotatable diaphragm operating ring 41 for adjusting the same. In the present instance, and for the purpose of directly connecting the two diaphragm operating rings together so that they will both be operated by manipulation of only one, each diaphragm operating ring 41 includes an arm 42, 42' extending from the shutter casing and turned back to extend to the rear of the casing. The diaphragm operating arms 42 and 42' of the two objective diaphragms are connected together by a mechanism including two rings 44 and 44' each rotatably mounted on studs 45 and 45' behind the respective shutters 11 and 11', said rings being connected together by a link 46 pivoted at opposite ends 47 and 47' to the rings 44 and 44'. Each ring 44 and 44' has a yoke 48, 48' on its periphery into which extends the end of the diaphragm operating arm 42 and 42' projecting from the shutter behind which it is located. By means of this connection, therefore, as the diaphragm operating member of one diaphragm is rotated to adjust the diaphragm with which it is associated, the other diaphragm operating arm will be given a corresponding adjustment so that the two will always be adjusted the same by an adjustment of only one. The diaphragms are adapted to be adjusted by rotation of a knurled diaphragm ring 49 rotatably mounted on the front of the housing 14 in concentric relation with the shutter 11, and operatively connected to the diaphragm operating arm 42 by the engagement of a turned down lug 50 on the arm with a slot 51 in the rear end of the ring, see Figs. 1 and 2. The diaphragm setting may be directly read in an indexed window 38 in the top of the housing 14 beneath which passes a movable diaphragm scale 39 connected to the diaphragm adjusting mechanism in any suitable manner, not shown, to be properly moved by an adjustment thereof.

The depth-of-field pointers 52 and 52' are extensions of pointer plates 53 and 53' of the form best shown in Fig. 6. As clearly shown in Figs. 3-7, the pointer plates or depth-of-field indicating members, 53 and 53', are rotatably mounted on bearing 28 in superposed relation and are held in place between a flange 54 on the bearing and a retainer plate 55. Extensions of the members 53 and 53' terminate in pointers which are bent up over the edge of the focus indicator and overhang the focusing scale thereon in a manner to cooperate therewith. It will be observed that the pointers 52 and 52' are symmetrically located on opposite sides of the stationary index 21, and as will be hereinafter fully set forth, are connected together to be simultaneously and symmetrically moved in opposite directions on opposite sides of said index when the diaphragms are adjusted.

Each of the pointer plates 53 and 53' are provided with a cylindrical socket 56, 56' into which a cylindrical end on connecting links 57, 57' is pivoted. The sockets confine the cylindrical ends in such a manner that they cannot be separated by relative movement in the same plane with the result that the links are capable of pushing or pulling the pointer plates. The parts are assembled by moving the cylindrical ends of the links into the sockets from a parallel plane above or below the same. The opposite ends of connecting links 57, 57' are brought together and pivotally connected at a common point to a depth-of-focus lever 58 by a stud 59. This lever is pivotally connected to a post 60 extending upwardly from the mechanism plate 27, and has fixed thereto an elongated pin 61 which extends through an arcuate slot 62 in the mechanism plate and into the path of a cam 63 fixed on the rear face of the diaphragm connecting link 46, see Figs. 1-4. The lever 58 is normally forced in a clockwise direction, looking at Fig. 1, by a spring 64 so that the pin 61 will be held against the cam and the movement of the lever will be controlled by the cam. The link 46 between the rings 44, 44' is a parallel bar linkage that moves longitudinally of the camera body as the diaphragms are adjusted. Thus as this link moves, the cam carried thereby moves the pin 61 and the lever 58 counter-clockwise or limits the movement of the lever 58 in a clockwise direction under the action of the spring 64, as the case may be depending upon the direction of movement of the link, said movement of the lever causing an adjustment of the pointers 52, 52' over the focus scale in accordance with the diaphragm adjustment to give an indication of the depth of field with any adjustment of diaphragm and focus of the objective. The contour of the cam 63 is determined by the focal length of the objective in use and the depth-of-field characteristics of such an objective with different focus adjustments and diaphragm settings. Referring to Figs. 3 and 4, it will be observed that the lever 58 is supported to swing in a given plane by having the end 65 of a branch 66 thereon, as well as the end 67 of the lever proper, engaging guide slots 68 formed in the spacing posts 26 on the top of which the bearing plate 25 is mounted.

From the above description of the present invention it will be readily appreciated that the present depth-of-focus indicator is properly adjusted by either a change in focus of the objectives, a change in the diaphragm, or a combination of both. This depth-of-field indicator possesses the great advantage that it gives a direct reading of the correct depth of field of the objective at all times, and this advantage is derived from the fact that the indicator is composed of a movable focusing scale and movable depth-of-field indicating pointers cooperating therewith, each of the two being adjusted relative to the other by a focus adjustment of the objectives and a change in the objective diaphragms, respectively. It is well known to those skilled in the art that the depth-of-field of the camera objective varies with the change in focus, the change in diaphragm, or a combination of both. Referring to Figs. 1 and 7 it will be observed that when the objectives are focused at 8 feet and the diaphragms are set at f/5.6, the depth of field, as indicated by the pointers, is from approximately 6 feet to 10 feet. Now if the diaphragm is left at f/5.6 and the focus is changed, the focusing scale will be rotated beneath the pointers so that they will span a new arc on the focusing scale although they themselves haven't moved. This change will give the change in depth of field due to change in focus alone. On the other hand, if the focus is not changed but the diaphragms are, the focusing scale will remain stationary and the pointers will be moved relative to one another thereover to indicate the new depth of field due to change in diaphragm openings alone.

By referring to Figs. 1 and 7 it can be seen that at a glance the operator can readily tell that the lens is focused at 7 feet that the diaphragm is set at f/5.6, and that the depth of field under these conditions is approximately 6 to 10 feet. One need only be shown a camera equipped with our novel depth-of-field indicator to convince him of the ease of operating and reading the same. By adjusting the objective mounts to different diaphragm settings and ranges of focus one will be impressed with the automatic nature of the device, no calculation or cross referencing of two or more cluttered tables or scales being required to obtain the desired depth-of-field reading.

The simplicity, efficiency, and adaptability of this depth-of-field indicator will be readily understood and appreciated from the above description of the same. It will also be readily apparent to one skilled in the art that this depth-of-field indicator is not limited to use with a stereo camera, or one having two objectives and two diaphragms, although it is shown incorporated on such a camera for purposes of disclosure. This fact is obvious inasmuch as the two objectives and two diaphragms of a stereo camera are connected together at all times to function as one, and can, therefore, be considered as one. It will be obvious to one skilled in the art that the depth-of-field indicator and operating mechanism therefor set forth can be applied to any ordinary camera having a single lens and a single diaphragm without any, or at best, very little modification. If there were room in a single lens camera for the one of the two rings 44, 44' not required in such a camera, then the mechanism set forth above could be used intact, the unnecessary ring 44 or 44' being used merely to properly support the link 46 carrying the cam 63. Furthermore, in such an instance a complete ring 44, 44' would not be required to support the end of the link 46 not connected to the diaphragm operating mechanism directly, a member capable of only the necessary arc of movement to maintain the parallel movement of the link 46 being necessary. On the other hand, it will be obvious to one skilled in the art that in the case of a camera having a single lens the cam 63 could be carried directly by a movable member of the diaphragm adjusting mechanism so long as it was situated to engage the pin 60, or its equivalent, in which case the link 46 and the second unnecessary one of the two rings 44, 44' could be eliminated completely.

Although we have shown and described certain embodiments of our invention, we are fully aware that many modifications of the same are possible. Our invention, therefore, is not to be restricted except insofar as is necessitated by the scope of the appended claims.

Having thus described our invention, what we claim is new and desire to secure by Letters Patent of the United States is:

1. In a photographic camera the combination with an objective, means for focusing said objective, an adjustable diaphragm, means for adjusting said diaphragm, a focus indicator, including a focusing scale, movable relative to a stationary index, means connecting said focus indicator to said focusing means whereby said scale is adapted to be moved relative to said index by operation of said focusing means, of means for indicating the depth of field of the objective for any adjustment of focus and diaphragm setting, said last mentioned means comprising a pair of pointers oscillatably mounted to move in overlapping relation, and relative to, said focusing scale on opposite sides of said index, a linkage for simultaneously oscillating said pointers symmetrically over said scale on opposite sides of said index and including a pair of links pivotally connected to opposite ones of said pointers and pivoted at a common point, and means actuated by adjustment of said diaphragm adjusting means for moving said common pivot point of said links in a direction to oscillate said pointers in accordance with an adjustment of the diaphragm.

2. In a photographic camera the combination with an objective, means for focusing said objective, an adjustable diaphragm, means for adjusting said diaphragm, a focus indicator, including a focusing scale, movable relative to a stationary index, means connecting said focus indicator to said focusing means whereby said scale is adapted to be moved relative to said index by operation of said focusing means, of means for indicating the depth of field of the objective for any adjustment of focus and diaphragm setting, said last mentioned means comprising a pair of pointers oscillatably mounted to move in overlapping relation, and relative to, said focusing scale on opposite sides of said index, a linkage for simultaneously oscillating said pointers symmetrically over said scale on opposite sides of said index and including a movable actuating arm, a pair of links pivotally connected to opposite ones of said pointers and pivoted at a common point on said actuating arm, and a member adapted to be moved by an adjustment of said diaphragm adjusting means and operatively connected to said actuating arm to move the same in a manner to adjust said pointers over said focusing scale in accordance with an adjustment of the diaphragm.

3. In a photographic camera the combination with an objective, means for focusing said objective, an adjustable diaphragm, means for adjusting said diaphragm, a focus indicator, including a focusing scale, movable relative to a stationary index, means connecting said focus indicator to said focusing means whereby said scale is adapted to be moved relative to said index by operation of said focusing means, of means for indicating the depth of field of the objective for any adjustment of focus and diaphragm setting, said last mentioned means comprising a pair of pointers oscillatably mounted to move in overlapping relation, and relative to, said focusing scale on opposite sides of said index, a linkage for simultaneously oscillating said pointers symmetrically over said scale on opposite sides of said index and including a movable actuating arm, a pair of links pivotally connected to opposite ones of said pointers and pivoted at a common point on said actuating arm, and a cam adapted to be moved by an adujstment of said diaphragm adjusting means and operatively connected to said actuating arm to move the same in a manner to adjust said pointers over said focusing scale in accordance with an adjustment of the diaphagm.

4. In a photographic camera the combination with an objective, means for focusing said objective, an adjustable diaphragm, means for adjusting said diaphragm, a focus indicator, including a focusing scale, movable relative to a stationary index, means connecting said focus indicator to said focusing means whereby said scale is adapted to be moved relative to said index by operation of said focusing means, of means for indicating the depth of field of the objective for any adjustment of focus and diaphragm setting, said last mentioned means comprising a pair of pointers oscillatably mounted to move in overlapping relation, and relative to, said focusing scale on opposite sides of said index, a linkage for simultaneously oscillating said pointers symmetrically over said scale on opposite sides of said index and including a movable actuating arm, a pair of links pivotally connected to opposite ones of said pointers and pivoted at a common point on said actuating arm, a cam adapted to be moved by an adjustment of said diaphragm operating means, and a part fixed to said actuating arm normally engaging said cam so that its movement is controlled thereby, whereby said pointers are adapted to be adjusted over said focusing scale in accordance with an adjustment of the diaphragm.

5. In a photographic stereo camera, the combination with a pair of objectives in spaced relation, a focusing mechanism for simultaneously focusing said objectives, an adjustable diaphragm for each of said objectives, a diaphragm operating mechanism for adjusting said two diaphragms simultaneously, and including a link for connecting the two diaphragm operating mechanisms together, a focusing scale movable relative to a stationary index, means connecting said focusing scale to said focusing mechanism whereby said scale is adapted to be moved relative to said index by operation of said focusing mechanism, a pair of movable depth-of-field indicating members cooperating with said scale and adapted, when moved, to move relative to said scale symmetrically on opposite sides of said index and indicate on said scale the depth of field of the objective with any adjustment of focus and diaphragm setting, and means connecting said depth-of-field indicating members to said diaphragm adjusting means, whereby said members are adapted to be moved by, and in accordance with, an adjustment of said diaphragm, said last mentioned means including a cam fixed to said link to move therewith when the diaphragm operating mechanism is adjusted and operatively connected to said indicating members to control the movement of said members relative to said focusing scale.

6. In a photographic stereo camera, the combination with a pair of objectives in spaced relation, a focusing mechanism for simultaneously focusing said objectives, an adjustable diaphragm for each of said objectives, diaphragm operating mechanism for adjusting said two diaphragms simultaneously, and including a link for connecting the two diaphragm operating mechanisms together, a focusing scale movable relative to a stationary index, means connecting said focusing scale to said focusing mechanism whereby said scale is adapted to be moved relative to said index by operation of said focusing mechanism, a pair of movable depth-of-field indicating members cooperating with said scale and adapted, when moved, to move relative to said scale symmetrically on opposite sides of said index and indicate on said scale the depth of field of the objective with any adjustment of focus and diaphragm setting, and means connecting said depth-of-field indicating members to said diaphragm adjusting means, whereby said members are adapted to be moved by, and in accordance with, an adjustment of said diaphragms, said last mentioned means including a cam fixed to said link to move therewith when the diaphragm operating mechanism is adjusted, a pivoted actuating arm connected to said indicating members to move the same when oscillated about its pivot point, said actuating arm normally moved in one direction wherein a part integral therewith is held against the face of said cam, whereby said cam is adapted to control the extent of pivotal movement of said actuating arm.

DAVID L. BABCOCK.
FLOYD J. FRISBY.